US010391825B2

(12) United States Patent
Cincunegui

(10) Patent No.: US 10,391,825 B2
(45) Date of Patent: Aug. 27, 2019

(54) HITCH WITH SELECTIVE TOW BALL

(71) Applicant: Joshua Cincunegui, Tampa, FL (US)

(72) Inventor: Joshua Cincunegui, Tampa, FL (US)

( * ) Notice: Subject to any disclaimer, the term of this patent is extended or adjusted under 35 U.S.C. 154(b) by 146 days.

(21) Appl. No.: 15/711,755

(22) Filed: Sep. 21, 2017

(65) Prior Publication Data
US 2018/0079266 A1   Mar. 22, 2018

Related U.S. Application Data

(60) Provisional application No. 62/397,418, filed on Sep. 21, 2016.

(51) Int. Cl.
B60D 1/06 (2006.01)
B60D 1/07 (2006.01)

(52) U.S. Cl.
CPC .............. B60D 1/065 (2013.01); B60D 1/06 (2013.01); B60D 1/07 (2013.01); B60D 1/075 (2013.01)

(58) Field of Classification Search
CPC . B60D 1/065; B60D 1/06; B60D 1/07; B60D 1/075
See application file for complete search history.

(56) References Cited

U.S. PATENT DOCUMENTS

| | | | | | |
|---|---|---|---|---|---|
| 3,801,134 A | * | 4/1974 | Dees | ........................ | B60D 1/07 280/416.1 |
| 3,922,006 A | * | 11/1975 | Borges | ..................... | B60D 1/07 280/416.1 |
| 4,248,450 A | * | 2/1981 | McWethy | ................ | B60D 1/06 280/416.1 |
| 5,135,247 A | * | 8/1992 | Alfaro | ...................... | B60D 1/07 280/415.1 |
| 5,265,899 A | * | 11/1993 | Harrison | .................. | B60D 1/07 280/416.1 |
| 5,322,313 A | * | 6/1994 | Schroeder | ............... | B60D 1/07 280/416.1 |
| 5,725,229 A | | 3/1998 | McWethy | | |
| 5,857,693 A | * | 1/1999 | Clark, Jr. | ................. | B60D 1/06 280/415.1 |
| 5,890,727 A | | 4/1999 | May | | |
| D409,124 S | * | 5/1999 | Bank | ........................... | D12/162 |
| 6,315,316 B1 | * | 11/2001 | Wyant | ..................... | B60D 1/06 280/415.1 |

(Continued)

*Primary Examiner* — Joseph M Rocca
*Assistant Examiner* — Michael R Stabley
(74) *Attorney, Agent, or Firm* — Global Intellectual Property Agency, LLP; Daniel Boudwin

(57) ABSTRACT

A hitch with selective tow ball. The hitch with selective tow ball includes a coupling member configured to be received by a vehicle's tow box. A spring pin bracket including a spring pin is connected to the coupling member. A shaft extending from the spring pin bracket includes shaft aperture thereon. A cylinder includes a plurality of selection apertures and a channel extending therethrough. The shaft is inserted through the rear end of the channel, and the cylinder is rotatable about the shaft. The spring pin is inserted through the shaft aperture and one of the plurality of selection apertures, and the spring pin is biased toward the cylinder. A plurality of tow balls are disposed on the front end of the cylinder. The spring pin can be pulled upward to permit rotation of the shaft and then released into a desired selection aperture corresponding to the desired tow ball.

12 Claims, 5 Drawing Sheets

(56) References Cited

U.S. PATENT DOCUMENTS

| | | | |
|---|---|---|---|
| 6,974,148 B2 * | 12/2005 | Moss | B60D 1/06 280/416.1 |
| 7,004,492 B2 * | 2/2006 | Moss | B60D 1/07 280/456.1 |
| 7,021,643 B1 * | 4/2006 | Buchanan | B60D 1/06 280/416.1 |
| 7,044,494 B1 | 5/2006 | Cowett | |
| D553,058 S * | 10/2007 | Chen | D12/162 |
| 8,366,133 B2 | 2/2013 | Brinkley | |
| 8,408,577 B2 * | 4/2013 | Works | B60D 1/06 280/490.1 |
| 8,684,389 B2 | 4/2014 | Gries | |
| 8,979,112 B2 * | 3/2015 | Weipert | B60D 1/07 280/490.1 |
| D730,782 S * | 6/2015 | Miller | D12/162 |

\* cited by examiner

HITCH WITH SELECTIVE TOW BALL

CROSS REFERENCE TO RELATED APPLICATIONS

This application claims the benefit of U.S. Provisional Application No. 62/397,418 filed on Sep. 21, 2016. The above identified patent application is herein incorporated by reference in its entirety to provide continuity of disclosure.

BACKGROUND OF THE INVENTION

The present invention relates to hitches for towing. More specifically, the present invention provides a hitch system that includes a plurality of different sized tow balls rotatably coupled to a hitch mount, such that the user may select the tow ball that receives a specific size hitch coupler of a trailer without removal of the hitch mount from the vehicle's hitch receiver.

When a vehicle tows a trailer, it is typically facilitated by a hitch system that includes a tow ball attached to a vehicle and a corresponding trailer coupler attached to a trailer. The tow ball extends from a hitch mount that is insertable in and securable to a vehicle's hitch receiver, or tow box. The trailer coupler can then be secured to the tow ball, ensuring a connection between the vehicle and the trailer that permits the trailer to turn when the vehicle turns. Hitch systems typically include a single tow ball mounted on the hitch mount. A single tow ball can only be utilized with a specifically sized trailer coupler, since the size of the tow ball must correspond to the size of the coupler. In order to tow trailers having smaller or larger couplers, an individual must purchase a new ball hitch mount and replace the current ball hitch mount, which can be both costly and time-consuming. It is therefore desirable to provide a hitch system that allows users to easily interchange between different sized tow balls without requiring uninstalling and reinstalling the hitch system.

There exist devices in the known art that provide hitch systems that include multiple tow balls. However, the devices in the known art have several drawbacks. In order to use the conventional multi-ball hitch systems, the user must remove multiple pins that secure the hitch mount to the vehicle in order to remove the entire hitch system from the receiver, manually rotate the system until the desired tow ball is in the proper position, place the hitch mount back into the receiver, and reinsert the pins. This can be a very difficult and time-consuming process. Further, the amount of steps it takes to change the tow ball presents multiple opportunities for the user to make a mistake. An improperly installed hitch system can be dangerous and may result in damage to the vehicle or trailer, or in injury to the user or other individuals.

In light of the devices disclosed in the known art, it is submitted that the present invention substantially diverges in design elements from the known art and consequently it is clear that there is a need in the art for an improvement to existing selective hitch systems. In this regard the present invention substantially fulfills these needs.

SUMMARY OF THE INVENTION

In view of the foregoing disadvantages inherent in the known types of hitches now present in the prior art, the present invention provides a hitch with multiple tow balls wherein the same can be utilized for providing convenience for the user when selecting a particular size tow ball for use with a particular size trailer hitch coupler. The hitch with selective tow ball includes a coupling member including a rear end, a front end, and a plurality of mounting apertures thereon, such that the coupling member is configured to be received by a vehicle's tow box. A spring pin bracket connected to the front end of the coupling member includes a vertical member oriented perpendicular to the coupling member and a horizontal portion extending in a forward direction and oriented parallel to the coupling member, and the horizontal portion includes a spring pin aperture thereon.

A shaft extending from the vertical portion of the spring pin bracket in a forward direction and oriented parallel to the coupling member includes shaft aperture thereon. A cylinder includes a plurality of cylinder apertures, a front end, a rear end, and a channel extending therethrough. The shaft is inserted through the rear end of the channel, and the cylinder is rotatable about the shaft. a spring pin a lower end inserted through the shaft aperture and one of the plurality of cylinder apertures, the spring pin biased toward the cylinder such that the spring pin exerts a force against the horizontal portion of the spring pin bracket; and a plurality of tow balls are disposed on the front end of the cylinder. The spring pin can be pulled upward to permit rotation of the shaft and then released into a desired cylinder aperture that corresponds with the desired size of tow ball.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
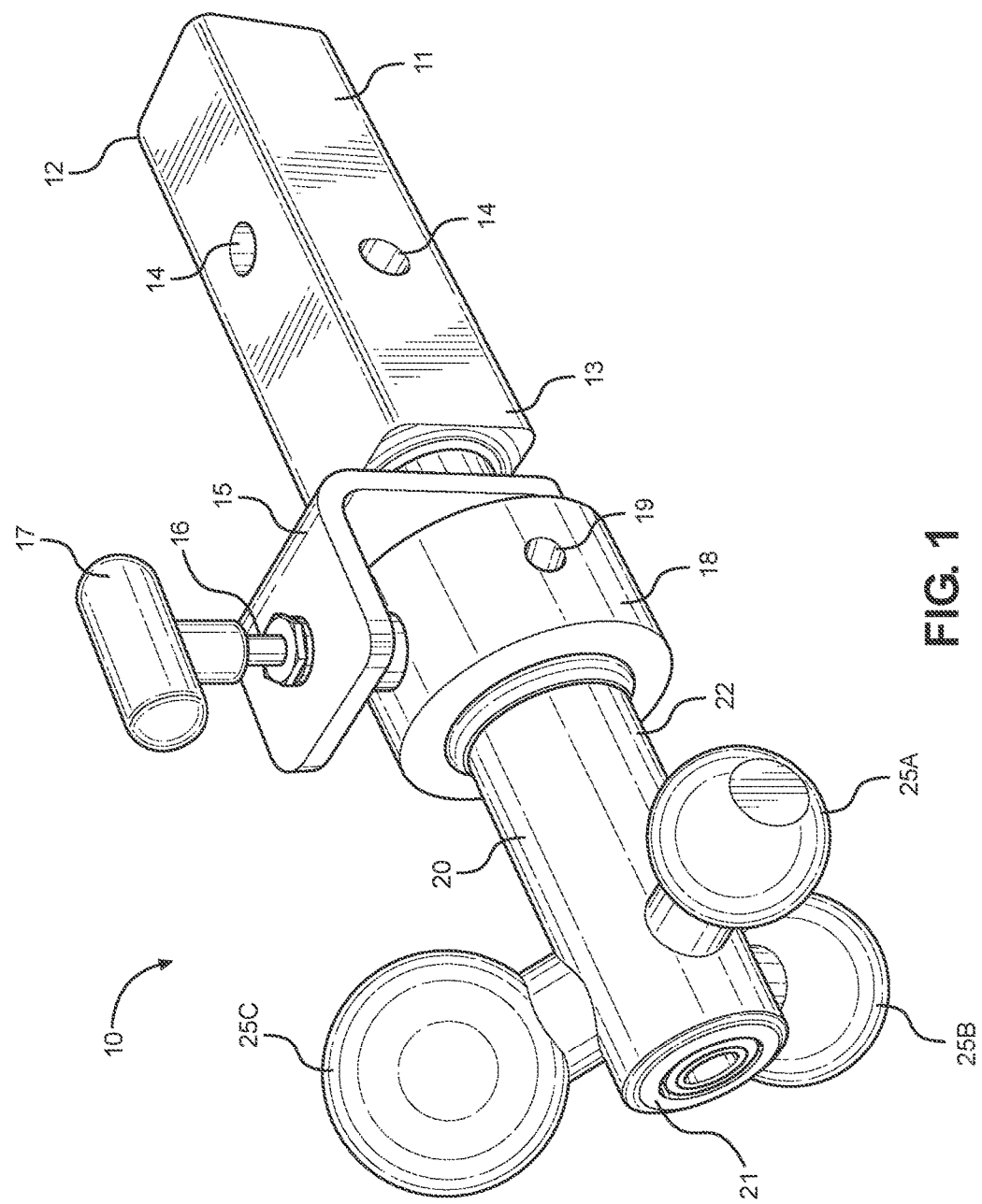
FIG. 1 shows a perspective view of the hitch with selective tow ball.

Reference is made herein to the attached drawings. Like reference numerals are used throughout the drawings to depict like or similar elements of the hitch with selective tow ball. For the purposes of presenting a brief and clear description of the present invention, the preferred embodiment will be discussed as used for providing a hitch system that includes multiple tow balls that can be interchanged without having to uninstall and reinstall the hitch mount. The figures are intended for representative purposes only and should not be considered to be limiting in any respect.

Referring now to FIG. 1, there is shown a perspective view of the hitch with selective tow ball. The hitch 10 is securable to a vehicle's tow box in the same manner as a typical tow hitch. The hitch 10 includes a plurality of tow balls that can be interchanged without removing the hitch 10 from the vehicle's hitch mount or tow box. The hitch 10 includes a coupling member 11 including a front end 13, a rear end 12, and a plurality of mounting apertures 14. The coupling member 11 is configured to be received by a vehicle's tow box via insertion of the rear end 12 into the tow box. The coupling member 11 can be secured to the tow box via fasteners inserted through the mounting apertures 14. In the shown embodiment, the coupling member 11 includes a square-cross section so that it can fit within a standard tow box. However, the coupling member 11 can have other dimensions in order to fit in a different type or size of tow box.

A spring pin bracket 15 is connected to the front end 13 of the coupling member 11. The spring pin bracket 15 supports a spring pin 16 having a handle 17 on an upper end thereof. A cylinder 20 is rotatably coupled to a shaft that extends from the spring pin bracket 15 in a forward direction. In the shown embodiment, the cylinder 20 includes a collar 18 on a rear end 22 thereof. The collar is disposed annularly about the rear end 22 of the cylinder 20, such that the diameter of the collar 18 is greater than the diameter of the cylinder 20. The collar 18 includes a plurality of selection apertures 19 thereon, such that each selection aperture 19 corresponds with one of a plurality of tow balls disposed on a front end 21 of the cylinder 20. In an alternate embodiment, the cylinder 20 includes a uniform diameter, and the selection apertures 19 are disposed on the rear end 22 thereof. In all embodiments, the spring pin 16 is inserted through one of the selection apertures 19 that corresponds to the desired tow ball, and the spring pin 16 can be pulled upward to permit rotation of the cylinder 20 to select a different tow ball.

In the shown embodiment, three tow balls 25A, 25B, 25C are disposed on the front end 21 of the cylinder 20, with each tow ball having a distinct diameter. In the shown embodiment, each tow ball is aligned with one of the selection apertures 19 on the collar 18, which makes it easier to select the desired tow ball. In alternate embodiments, the cylinder 20 can include a different number of tow balls.

Figure 2:
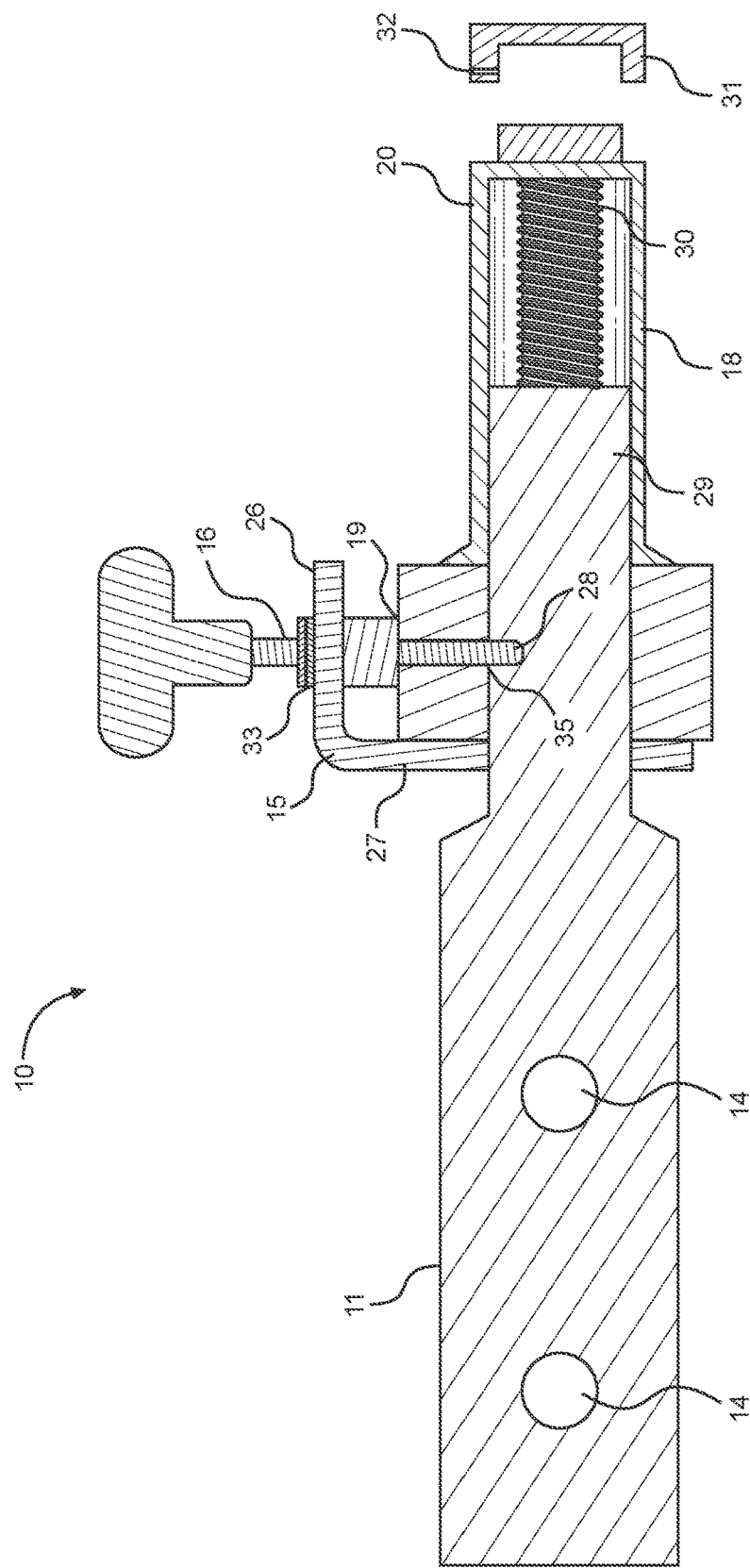
FIG. 2 shows a side view of the hitch with selective tow ball.
Figure 3:
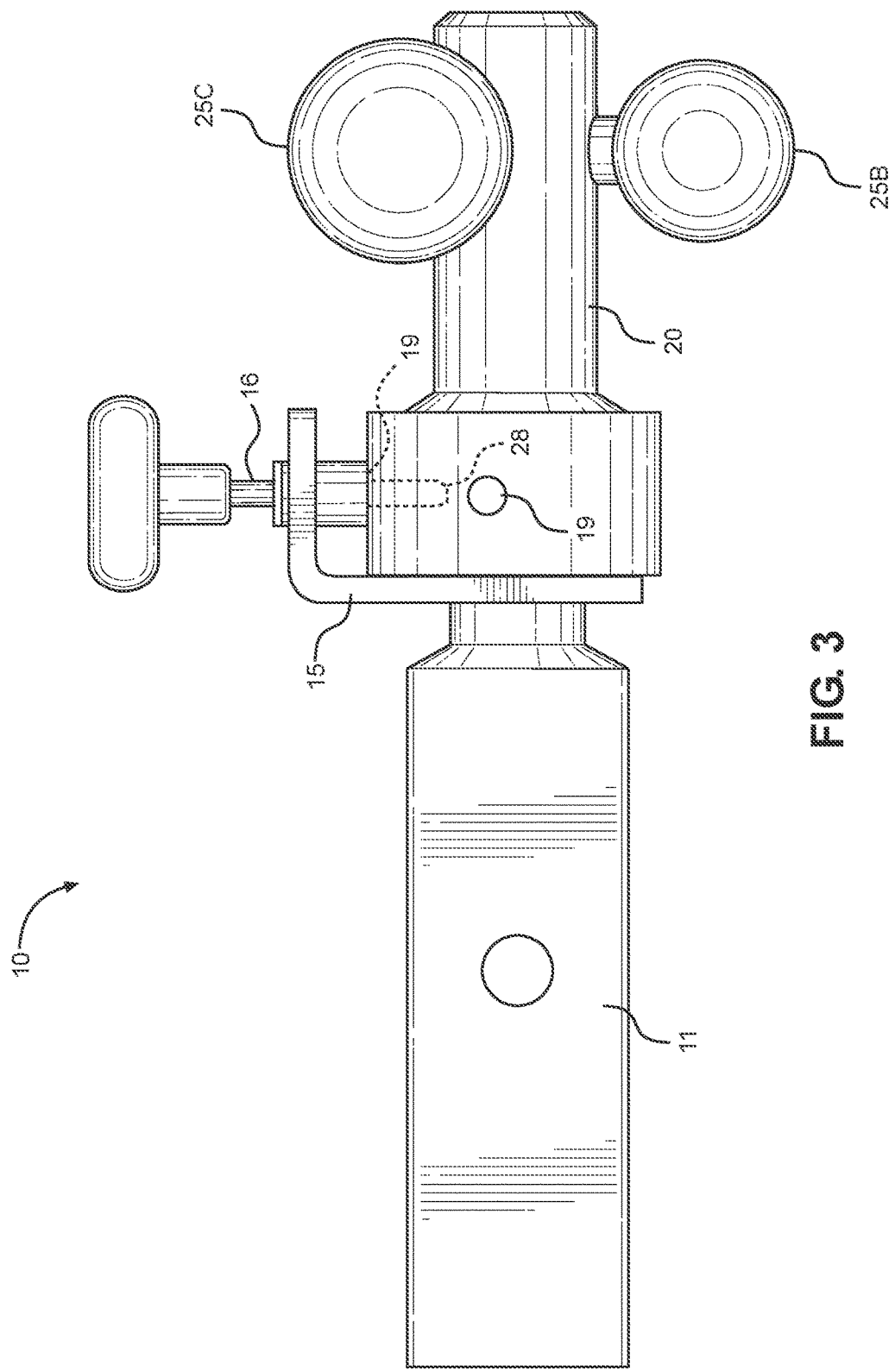
FIG. 3 shows an alternate side view of the hitch with selective tow ball.

Referring now to FIGS. 2 and 3, there is shown a side view of the hitch with selective tow ball and an alternate side view of the hitch with selective tow ball, respectively. The shaft 29 is oriented parallel to the coupling member 11 and extends in a forward direction from the spring pin bracket 15, and the cylinder 20 includes a channel therethrough such that it is rotatably mounted over the shaft 29 via insertion of the shaft 29 through the channel. In the shown embodiment, the diameter of the shaft 29 is less than the width of the coupling member 11 and less than the diameter of the cylinder 20 so that it can be inserted through the cylinder channel. The cylinder 20 can be locked in place on the shaft 29 via the spring pin 16, which is mounted to the spring pin bracket 15. The spring pin bracket 15 includes a vertical member 27 and a horizontal member 26, wherein the vertical member 27 is oriented perpendicular to the coupling member and the horizontal member 26 extends in a forward direction and is oriented parallel to the coupling member 11.

The cylinder 20 includes a fastener 30 such as a bolt inserted therethrough which engages the shaft 29 in order to secure the cylinder 20 to the hitch 10. The fastener 30 includes a flange configured to prevent the cylinder 20 from detaching or sliding off of the shaft 29 while still permitting rotation of the cylinder 20. In the shown embodiment, an end cap 31 is removably securable over the flanged portion of the fastener 30. The end cap 31 is secured over the fastener 30 via a set screw 32 that inserts through an aperture on the end cap 31 and engages the fastener 30.

The spring pin 16 is inserted through a spring pin aperture 33 on the horizontal portion 26 of the spring pin bracket 15. The spring pin 16 is further inserted through one of the selection apertures 19 corresponding to the desired tow ball. The lower end 28 of the spring pin 16 is then inserted through a shaft aperture 35 which is disposed on an uppermost portion of the shaft 29. The spring pin 16 is biased downward toward the cylinder 20 and the shaft 29, such that the spring pin 16 exerts a constant force against the horizontal portion 26 of the spring bracket 15, preventing rotational movement of the cylinder 20. In one embodiment, the spring pin 16 is configured to exert a force of twenty pounds. In other embodiments, the spring pin 16 can be configured to exert a force between a range of fifteen to twenty-five pounds. The downward force prevents the spring pin 16 from falling out during use of the hitch 10 and ensures the cylinder 20 remains locked in place during use.

When a user wishes to select a desired tow ball, the user may pull the spring pin 16 upward, such that it is removed from the shaft aperture 35 and selection aperture 19. The cylinder 20 can then be rotated until the selection aperture 19 corresponding to the desired tow ball is positioned beneath the spring pin 16. The user can then release the spring pin 16, which then self-inserts through the selection aperture 19 and shaft aperture 35 via the downward biasing force, locking the cylinder 20 in place such that the desired tow ball is secured in position for use.

Figure 4:
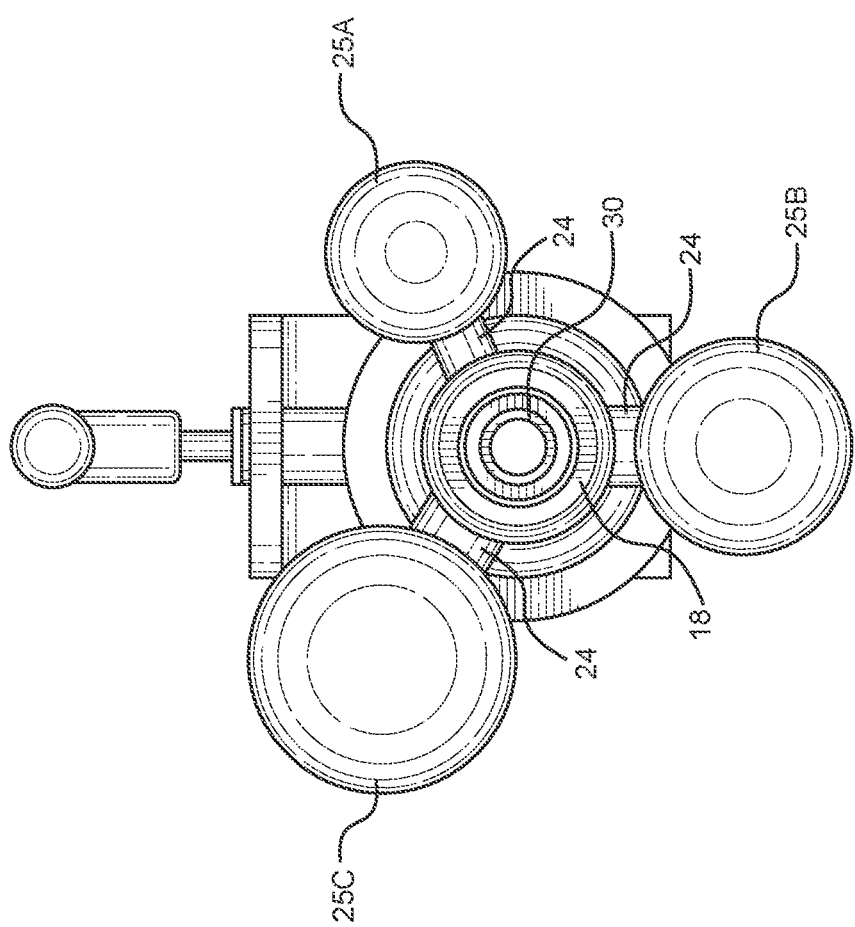
FIG. 4 shows a front elevation view of the hitch with selective tow ball.

Referring now to FIG. 4, there is shown a front elevation view of the hitch with selective tow ball. In the shown embodiment, each tow ball is connected to a post 24 that extends radially outwardly from the cylinder 20. In the shown embodiment, each of the three tow balls 25A, 25B, 25C include a distinct diameter. In an exemplary embodiment, the first tow ball 25A includes a diameter equal to 1.875 inches, the second tow ball includes a diameter equal to 2 inches, and the third tow ball includes a diameter equal to 2.3125 inches. The above diameters correspond to standard trailer coupler sizes. However, alternate diameters may be utilized in order to couple the hitch to a different type or size of trailer coupler.

Figure 5:
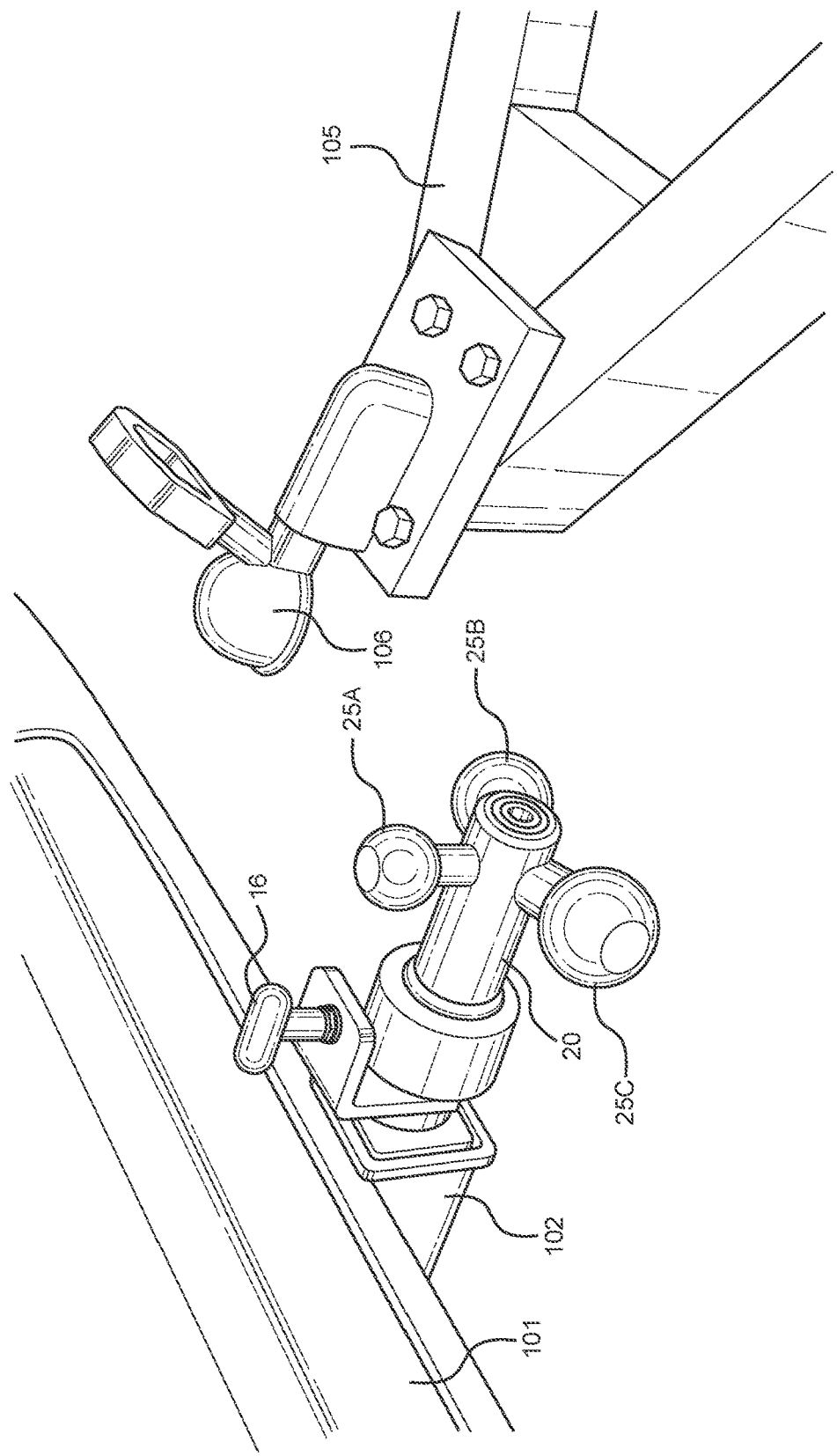
FIG. 5 shows a perspective view of the hitch with selective tow ball.

Referring now to FIG. 5, there is shown a perspective view of the hitch with selective tow ball. The coupling member of the hitch is inserted in a vehicle's tow box 102 on the rear of the vehicle 101 and secured thereto. In use, the user may pull the spring pin 16 upward and rotate the cylinder 20 until the desired tow ball is positioned vertically. The user then releases the spring pin 16, which locks the cylinder 20 in place. The user can then attach the coupler 106 of a trailer 105 to the selected tow ball. In this way, a user may easily change to a desired tow ball without having to first remove the hitch system from the vehicle's tow box.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hitch, comprising:
   a coupling member comprising a rear end, a front end, and a plurality of mounting apertures thereon, the coupling member configured to be received by a vehicle's tow box;
   a spring pin bracket connected to the front end of the coupling member, the spring pin bracket including a vertical member oriented perpendicular to the coupling member and a horizontal portion extending in a forward direction and oriented parallel to the coupling member, the horizontal portion including a spring pin aperture thereon;
   a shaft extending from the vertical portion of the spring pin bracket in a forward direction, the shaft oriented parallel to the coupling member, the shaft including a shaft aperture thereon;
   a cylinder including a plurality of selection apertures, a front end, a rear end, and a channel extending therethrough, wherein the shaft is inserted through the rear end of the channel, and wherein the cylinder is rotatable about the shaft;
   a spring pin including a lower end inserted through the shaft aperture and one of the plurality of selection apertures, the spring pin biased downward toward the cylinder such that the spring pin exerts a force against the horizontal portion of the spring pin bracket; and
   a plurality of tow balls disposed on the front end of the cylinder.

2. The hitch of claim 1, wherein the cylinder includes a fastener therethrough such that the fastener engages the shaft, the fastener having a distal flange configured to prevent the cylinder from detaching from the shaft.

3. The hitch of claim 2, further comprising an end cap removably securable over the distal flange of the fastener via a set screw that is configured to engage the fastener.

4. The hitch of claim 1, wherein the spring pin further includes an upper end having a handle thereon.

5. The hitch of claim 1, wherein the spring pin is configured to exert a force within the range of fifteen pounds to twenty-five pounds.

6. The hitch of claim 1, wherein each selection aperture of the plurality of selection apertures is disposed on a collar, wherein the collar is disposed annularly around the rear end of the cylinder.

7. The hitch of claim 1, wherein the shaft includes a diameter that is less than a diameter of the coupling member.

8. The hitch of claim 1, wherein each tow ball is connected to a post that extends radially outwardly from the cylinder.

9. The hitch of claim 8, wherein the plurality of tow balls includes a first tow ball, a second tow ball, and a third tow ball.

10. The hitch of claim 9, wherein the first tow ball includes a diameter equal to 1.875 inches.

11. The hitch of claim 10, wherein the second tow ball includes a diameter equal to 2 inches.

12. The hitch of claim 11, wherein the third tow ball includes a diameter equal to 2.3125 inches.

* * * * *